United States Patent

Nitta

[15] 3,689,777
[45] Sept. 5, 1972

[54] INSULATOR TYPE POWER CIRCUIT BREAKER

[72] Inventor: Yoshio Nitta, Kawasaki, Japan

[73] Assignee: Fuji Denki Seizo Kabushiki Kaisha, Kanagawa-ken, Japan

[22] Filed: Dec. 22, 1970

[21] Appl. No.: 100,627

[52] U.S. Cl. .....................307/140, 317/58, 200/148
[51] Int. Cl. .............................................H01h 33/82
[58] Field of Search............307/140, 138, 92, 93, 94; 317/36 D, 58 X, 59, 60; 200/148

[56] References Cited

UNITED STATES PATENTS 3,315,147   4/1967   Cook et al. ...............317/58 X
3,315,056   4/1967   Furukawa et al. ......200/148 R

*Primary Examiner*—Herman J. Hohauser
*Attorney*—Holman & Stern

[57] ABSTRACT

An insulator type power circuit breaker comprising at least one circuit breaking part supported by an elongated insulator, in which a current transformer adapted to detect the bus line current, a potential transformer adapted to produce pulse voltage at zero point of the current, and a converter for converting said pulse voltage into an electromagnetic wave are provided at a high potential part, said electromagnetic wave being radiated through interior of said insulator to a receiving device provided at an earth potential part and then converted to at least one electric signal by means of a converter provided at said receiving device, said electric signal being used as a control signal, whereby electric variation of the bus line current is accurately transmitted to an earth potential side without necessitating independent insulators for supporting said current and potential transformers.

1 Claim, 5 Drawing Figures

PATENTED SEP 5 1972 3,689,777

INVENTOR
Yoshio Nitta

BY Holman & Stern
ATTORNEYS

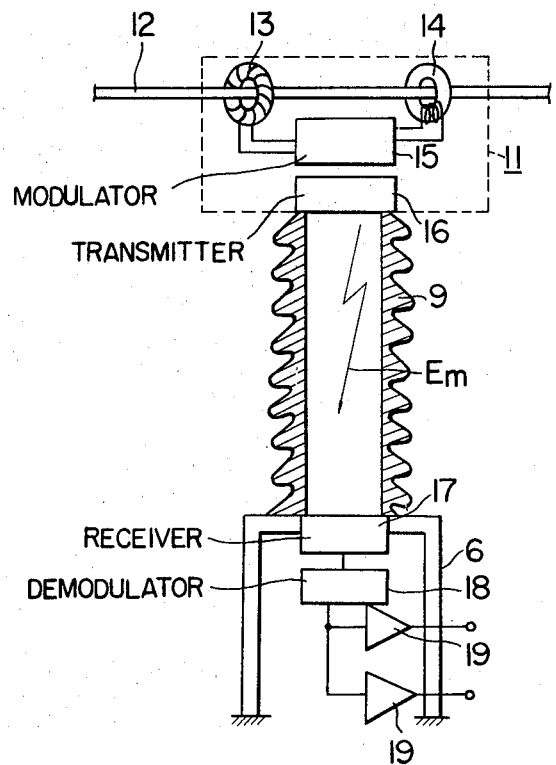
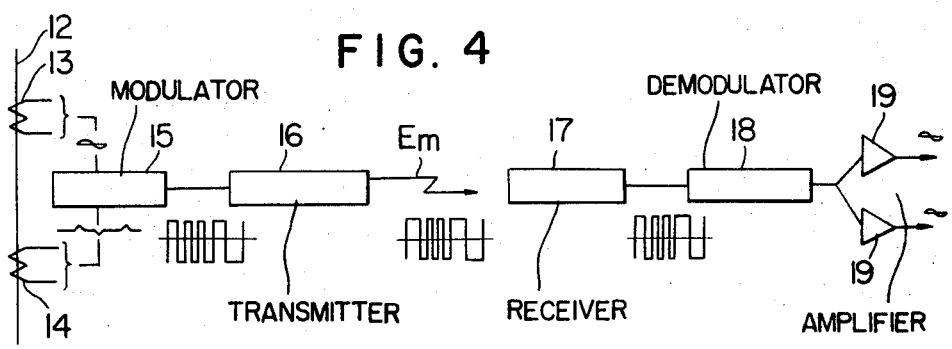

INSULATOR TYPE POWER CIRCUIT BREAKER

BACKGROUND OF THE INVENTION

Generally, conventional power circuit breakers require an independent current transformer and a potential transformer. Particularly, the current transformer is indispensable for the purpose of causing opening of the circuit breaking electrodes.

Although when the power circuit breaker is used for any normal high voltage or low voltage power station or substation, the subsidiary devices such as the current transformer and potential transformer are relatively low cost, in the case of providing the circuit breaker in a super high voltage system, said subsidiary devices become remarkably expensive and furthermore, cost of the circuit breaker apparatus depends upon dimension of the insulator supporting said subsidiary devices.

Accordingly, if a power station or substation of super high voltage system is to be established by using subsidiary devices which are independent of the circuit breaker, a broad ground area and a large expense will be required.

SUMMARY OF THE INVENTION

Therefore, an essential object of the present invention is to provide an improved power circuit breaker capable of producing electric signals being used as various control signals, without necessitating independent subsidiary devices such as current and potential transformers.

The above object and other objects, characteristic feature, and function of the invention will be become apparent from the following description taken in conjunction with the appended drawings, in which the same or equivalent members are indicated by the same numerals.

BRIEF DESCRIPTION OF THE DRAWINGS

FIG. 3 shows an essential part, in section, of the embodiment of FIG. 2; and

FIG. 4 shows a block diagram of the embodiment of FIG. 2, for describing operational function of the apparatus.

DETAILED DESCRIPTION OF THE INVENTION

Figure 1A:
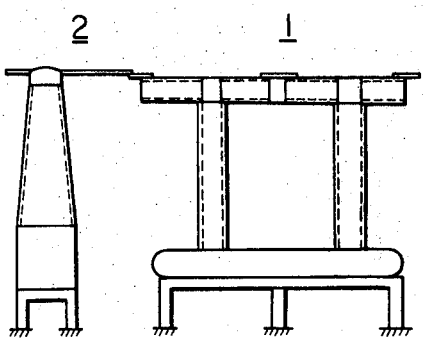
FIGS. 1(A) and 1(B) are schematic elevational views for showing conventional circuit breaker apparatuses of two kinds, respectively.
Figure 1B:
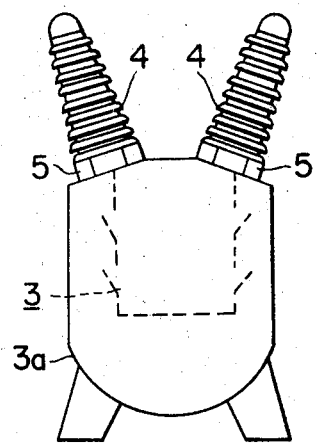

As is well-known, high-tension power circuit breaker systems can be classified from their constructional point of view into an insulator type circuit breaker system, the circuit breaking part of which is supported on an elongated insulator, and a tank type circuit breaker system. Furthermore, each of said circuit breaker systems as broadly classified can be further classified from a distinguishing point of view into various kinds. At any rate, all kinds of the circuit breakers are generally connected to the bus lines in their states assembled with their subsidiary current transformer or potential transformer, so that in the case of establishment of a new power generating station or substation, it is conventional that the demander or orderer requires design and manufacture including said subsidiary devices also, without requiring only an independent circuit breaker. Particularly, since the current transformer for use in various measurements is indispensible for the operation of the circuit breaker itself, it is conventional that the demander give an order for assembled apparatus consisting of the circuit breaker itself and the current transformer. For example, in the case of insulator type circuit breaker apparatus, this apparatus consists of a circuit breaker 1 and a current transformer 2 provided at a position near the circuit breaker 1, as shown in FIG. 1(A). On the other hand, in the case of the tank type circuit breaker apparatus, this apparatus consists of a circuit breaker 3 enclosed in an oil tank 3a and bushing type current transformers 5 provided at base parts of the bushings 4, as shown in FIG. 1(B).

At any rate, selection of one of the abovementioned circuit breaker apparatuses by demander and manufacturer depends conventionally upon economical considerations and the degree of high voltage.

Although in the case of the tank type circuit breaker apparatus, particular consideration of the relation between the system voltage and its cost is not necessary; but in the case of the insulator type circuit breaker apparatus, cost of the current transformer increases with increase of the system voltage, thus causing increase of total cost of the circuit breaker apparatus.

The present invention has proposed an improved insulator type circuit breaker, in which cost of the circuit breaker decreases with increase of the system voltage and a current transformer adapted particularly to transmit accurately electrical variation of the bus line current to the earth side is enclosed in the insulator of the circuit breaker itself.

Figure 2:
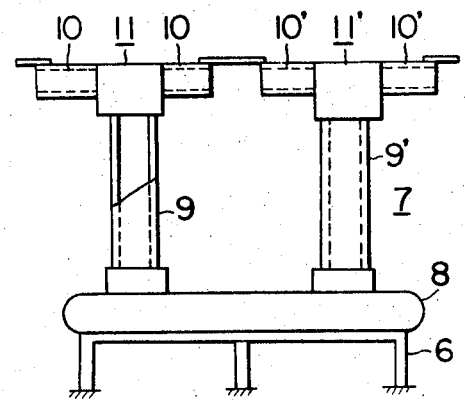
FIG. 2 is a schematic elevational view of one embodiment according to the invention.

Referring to FIG. 2, the circuit breaker 7 supported, through a compressed gas tank 8, on a support platform 6 comprises two hollow support insulators 9 and 9', circuit breaking parts 10 and 10', and signal transmitting devices 11 and 11' which are respectively positioned between the parts 10 and 10, and between the parts 10' and 10', said circuit breaker being constructed so as to be always filled with the compressed gas in normal condition. The structure shown in FIG. 2 corresponds to one phase, so that in the case of three phase system three devices each having said structure are used in assembled state.

FIG. 3 shows, in detail, the signal transfer device 11 shown in FIG. 2. This transmitter 11 comprises a current transformer 13 and a potential transformer 14 through which a bus line 12 is passed, an electronic modulator or converter 15, and an electronic transmitter 16. The potential transformer 14 is designed so that saturation state of said transformer is established in the case of normal load current and said transformer generates a pulse voltage at zero point of the current passing therethrough. The modulator 15 operates to modulate output current of said transformer 13 and said pulse voltage of the potential transformer 14, and the transmitter 16 operates to convert the modulated output of said modulator 15 into an electromagnetic wave and transmits downward its output wave Em through the interior of the insulator 9. The electromagnetic wave Em transmitted from the transmitter 16 is radiated to an earth potential part through the support insulator 9 as mentioned above. This transmitted wave is received by a receiver 17, demodulated by a demodulator 18, and then supplied to amplifiers 19 outputs of which are transmitted as electric signals for operating various control devices.

The assembled structure shown in FIG. 3 is shown in FIG. 4 by block diagram for the sake of easy comprehension of the operation of the circuit breaker.

When a normal current is flowing through the bus line 12, outputs each having a predetermined constant value are produced from the amplifiers 19 provided at an earth potential part. However, devices to be controlled by said outputs, said devices being not shown, are adjusted so that said devices are not operated by said outputs produced in the normal current of the bus line 12.

Now, when an over current such as short-circuit current passes through the bus line 12, the output voltages of the amplifiers 19 increase abruptly without time-delay thereby to operate instantaneously the devices to be controlled, thus causing instantaneous excitation of a conventional tripping device to thereby open the circuit breaker.

Although detailed structure is not shown in FIGS. 2 and 3, compressed gas in the tank 8 is always introduced into the circuit breaking parts 10 and 10' by means of insulating tubes not shown, but passed through the support insulators 9 and 9', so that upon opening of the circuit breaking electrodes, the produced arc between the circuit breaker contacts can be effectively extinguished by said compressed gas being filled in the circuit breaking part. Closing operation of the circuit breaker is carried out by any conventional method.

As described above, according to the present invention, the interior of the support insulator for supporting the circuit breaking part is skilfully utilized as a passage for an electromagnetic waves, and a transmitter and a receiver therefor are respectively enclosed in high potential and earth potential parts, so that an independently provided transformers such as 2 in FIG. 1(A) which have been indispensable in the conventional insulator type circuit breaker apparatuses become unnecessary, thus causing effective decrease of the whole cost of the circuit breaker apparatus.

What is claimed is:

1. An insulator type power circuit breaker apparatus provided with at least one circuit breaking part supported by an elongated hollow insulator, said apparatus including a current transformer coupled with a bus line to be protected and adapted to detect current of said bus line, a potential transformer coupled with said bus line and adapted to generate a pulse voltage at each zero point of said current, a converting-transmitting means adapted to convert outputs of both said transformers into and electromagnetic wave and to transmit said electromagnetic wave, said transformers and converting-transmitting means being disposed at a position above said insulator so as to transmit said electromagnetic wave downward through said insulator, and a receiving device provided at an earth potential part below said insulator to receive said electromagnetic wave transmitted through said insulator, said receiving device comprising means for converting the received electromagnetic wave into an electric signal to be used for controlling various devices provided in the circuit breaker apparatus.

* * * * *